United States Patent [19]

Catterfeld et al.

[11] Patent Number: 4,644,207
[45] Date of Patent: Feb. 17, 1987

[54] INTEGRATED DUAL PUMP SYSTEM

[75] Inventors: Fritz C. Catterfeld, Canoga Park; Ralph E. Kroy, Granada Hills, both of Calif.

[73] Assignee: Rockwell International Corporation, El Segundo, Calif.

[21] Appl. No.: 722,914

[22] Filed: Apr. 15, 1985

[51] Int. Cl.[4] ............................................. H02K 21/10
[52] U.S. Cl. .................................... 310/126; 310/114; 310/156; 310/52; 417/321; 417/410; 417/426
[58] Field of Search ................ 310/112, 114, 126, 90, 310/156, 254, 268, 83, 68 R, 68 B, 52-54, 58, 59; 417/321, 326, 350-357, 366, 370, 371, 410, 426

[56] References Cited

U.S. PATENT DOCUMENTS

| | | | |
|---|---|---|---|
| 1,780,337 | 11/1930 | Canton | 310/126 UX |
| 3,308,318 | 3/1967 | Dunaiski et al. | 310/126 X |
| 3,939,370 | 2/1976 | Müller | 310/126 X |
| 4,358,254 | 11/1982 | Hannibal | 310/114 X |
| 4,375,047 | 2/1983 | Nelson et al. | 310/114 X |
| 4,387,335 | 6/1983 | Fisher et al. | 310/126 X |
| 4,525,655 | 6/1985 | Walker | 310/112 X |

Primary Examiner—Mark O. Budd
Attorney, Agent, or Firm—H. Fredrick Hamann; Harry B. Field; David C. Faulkner

[57] ABSTRACT

An integral combination of two motor pumps wherein two pumps 12, 14 are operated preferably from the motor shafts 41, 43 of a centrally located, pancake-type, d.c., brushless electric motor 10, the entire combination being housed in a unitary casing. The stator 22 is located within a central peripheral cavity between a pair of rotor faces 26, 28 in which are set spaced permanent mangets 32, 34 which react with the commutated d.c. fields of the stator coils to rotate the rotors 36, 38. Each rotor, e.g. 38, is integral with a motor shaft section which is integrally coupled with a pump shaft, e.g., 44. The pump shaft 44 supports an inducer 46 and an impeller 48 which pump a fluid that is also sent through passages in the motor 10 to lubricate the sleeve bearings 54 and to cool the motor components. The speeds of the rotor 36, 38 can be individually adjusted, for example, by adjusting the number of permanent magnets 32, 34 in each rotor face 26, 28. Counterrotation of the rotors 36, 38 can be achieved by proper orientation of the permanent magnets 32, 34 relative to the positions of the stator coils 24 and by stator current switching control. The pump shafts 42, 44 can be made to rotate together mechanically at the same speed by connecting the motor shafts 41, 43 together by means such as a splined bar 90, or electrically by synchronizing the rotor/shafts through the controller.

15 Claims, 2 Drawing Figures

INTEGRATED DUAL PUMP SYSTEM

BACKGROUND OF THE INVENTION

1. Field of the Invention

This invention relates to an integrated dual pump system and specifically to a dual pump system having counterrotating and separate speed capabilities.

2. Description of the Prior Art

In turbopump assemblies where the gas turbine and the fuel and oxidizer pumps are mounted to a single shaft, the turbine and the pumps operate at the same rotational speed. Propellant properties (e.g., fluid density), however, may vary considerably between the fluids in the two propellant pumps. Therefore, in most single-shaft turbopump designs, the operating speed of one or the other or both pumps is different from the optimal condition. The result is operation of the pump, or pumps, at less than peak efficiency.

OBJECTS OF THE INVENTION

An object of the invention is to provide an integrated dual pump system with a motor section and two pump sections in the same housing.

Another object is to provide such an integrated dual pump system wherein the pumps can be counterrotating.

A further object is to provide such a dual motor pump wherein the pumps may each operate at a different speed or at the same speed.

Other objects, advantages and novel features of the present invention will become apparent from the following detailed description of the invention when considered in conjunction with the accompanying drawing.

SUMMARY OF THE INVENTION

The present invention is a dual pump motor which substitutes a single electric motor for two separate motors. The single motor is a pancake-type, brushless, d.c. electric motor wherein the stator section is centrally located between two rotor sections each of which is integrated with a rotating component of a different pump, such as the impeller, or the pump shaft, or both. If the rotor sections are integrated, both pumps are rotated at the same speed. If the rotor sections are independent of each other, they can be made to counterrotate and to rotate at different speeds.

BRIEF DESCRIPTION OF THE DRAWING

In the drawing.

The same elements or parts throughout the figures of the drawing are designated by the same reference characters, while equivalent elements bear a prime designation.

DETAILED DESCRIPTION OF THE INVENTION

Figure 1:
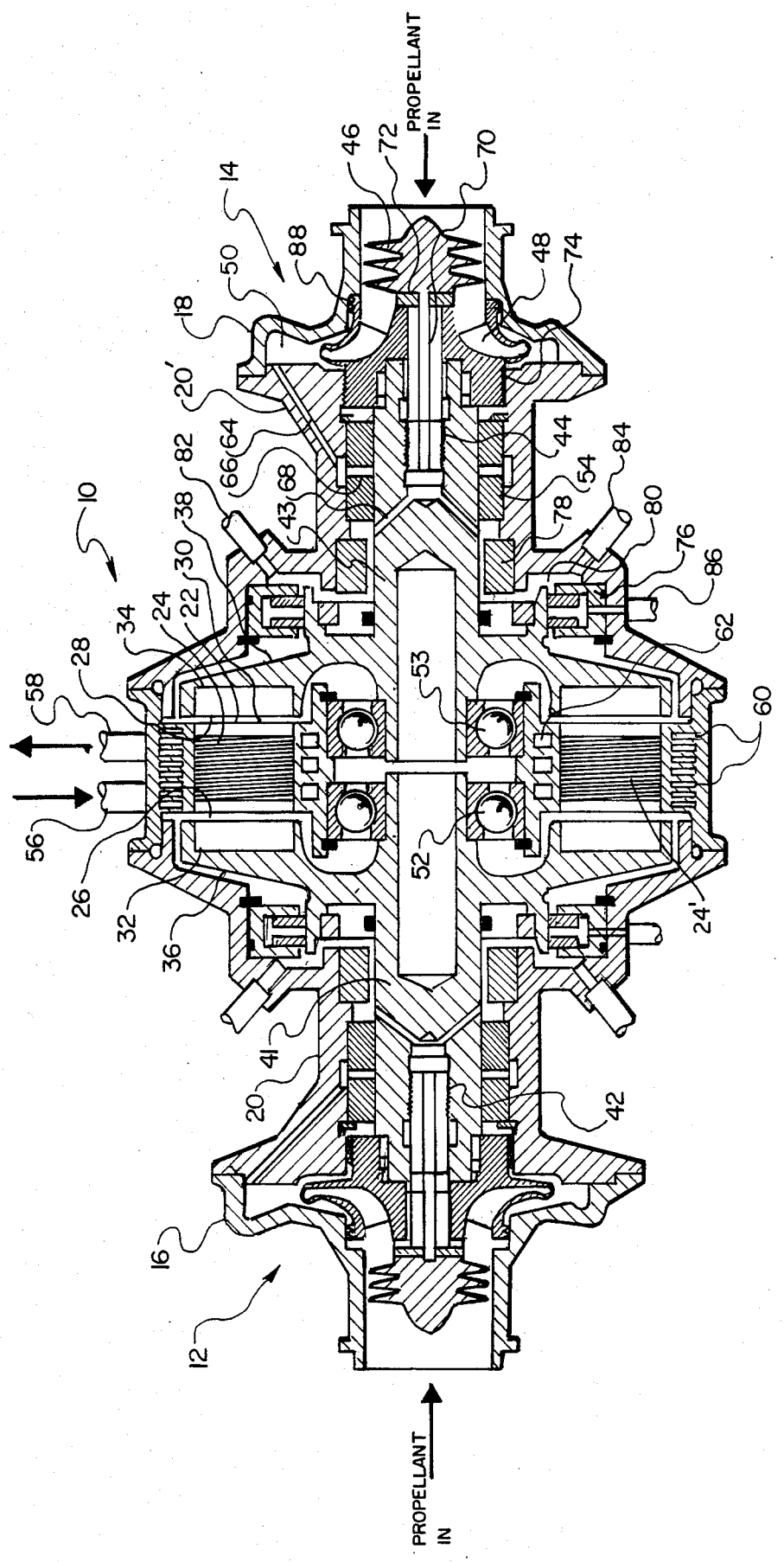
FIG. 1 is an axial cross-section of an embodiment of the invention.

As shown in FIG. 1, the invention comprises a motor section 10, a left pump section 12 and a right pump section 14. The pump section housings 16 and 18 are connected to the motor-section housing sections 20, 20' and hermetically sealed by any suitable means, such as welding. (Since the left side of the motor pump is basically the same as the right side. it is to be understood that the components and systems on one side are the same as those on the other side and that sometimes only one side will be described, it being understood that the description also applies to the other side.)

The motor section 10 comprises a dual stator 22 having at least two spaced electromagnetic coils 24, 24' and at least two rotors 36, 38 with rotor faces 26, 28 spaced from the stator 22 as by narrow air gap 30. At least two permanent magnets 32, 34 of samarium cobalt or neodymium iron, for example, are set into each rotor face at a radial distance which places them opposite the coils of the stators 24 and 24'. The speeds and direction of rotation of each rotor can be adjusted by the number of permanent magnets employed, the initial orientation of the magnets relative to the coils, and the position-sensing (relative) signals to the logic and control elements. The frequency of the commutations of the commutated d.c. current fed to the coils also affects the speed of rotation.

The rotors 36, 38 are connected to motor shafts 41, 43 which are integrally connected with the pump shafts 42, 44. To each pump shaft, e.g., 44, there is attached an impeller 48 and, if required, an inducer 46. The propellant for each pump, e.g., 14 is brought in to the inducer 46 which increases the propellant pressure and propels the propellant into the vaned passages of the impeller 48. The impeller 48 propels the fluid into an exit cavity 50 and, from there, out of the pump 14 through a conduit (not shown) in the housing 20'.

The stator 22 supports the motor shafts 41, 43 by sets of permanently lubricated, anti-friction ball bearings 52, 53. Each ball bearing supports the axial rotor thrust of its respective rotor assembly that is generated by the magnetic attraction of the rotor and the attached propellant pump. The left and right motor shafts 41, 43 are also supported with respect to the housing by an annular sleeve bearing 54, preferably of carbon, and lubricated by a portion of the pumped fluid.

The pumped fluids also serve as a lubricant and a coolant as required for cooling. Fluid can be brought in from one of the propellant tanks, whichever propellant fluid is considered more suitable, through a conduit 56 to outer and inner annular passageways 60 and 62 which are located in the stator 22 for the purpose of cooling the stator 22. The stator coolant fluid is then returned to the propellant tank through return conduit 58. For bearing cooling and lubricating, a small portion of pumped fluid is forced through passages 64 in the motor housing 20' into a passage 66 in the sleeve bearing 54 and into the sleeve bearing rotor shaft interface. (The fluid of a pump is used to lubricate/cool only the bearing with which that pump is associated.) From the interface, the leakage fluid proceeds through a passage 68 in the motor shaft 43, into an axial passage 70 in the center of the pump shaft 44, and into a radial passage 72 in the pump. A small portion of the pressurized pumped fluid in the cavity 50 is also forced past an annular labyrinthine seal 74 which provides a lower pressure cavity for proper propellant fluid flow through the bearing.

The rotor, e.g., 38, is further sealed by an annular shaft riding seal 76 positioned between an annular face contact seal 78 and the housing 20'. Both of these seals may be made of carbon. A cavity 80 is present between the seals 76, 78 and the housing 20'. The cavity 80 and seals 76, 78 may be cleared of any fluid leakage past the seals 76, 78 by an inert gas brought in through a purge line 82 and removed through a drain line 84. If necessary, the interior of the shaft riding seal 76 may be cleared by gas brought in through an auxiliary purge line 86.

A second, smaller labyrinthine seal 88 is affixed to the impeller 48 and contacts the pump housing 18 to seal off the fluid exit cavity 50.

It should be noted that, for the cases of rotors operating at different speeds or in the opposite direction (counter-rotation), the stators must be electrically and magnetically independent of each other. Independent position/speed sensors (not shown) must also be provided to sense the position and speed of each rotor with the object of controlling the currents to the stator coils for desired adjustments of the position and speed of each rotor.

Figure 2:
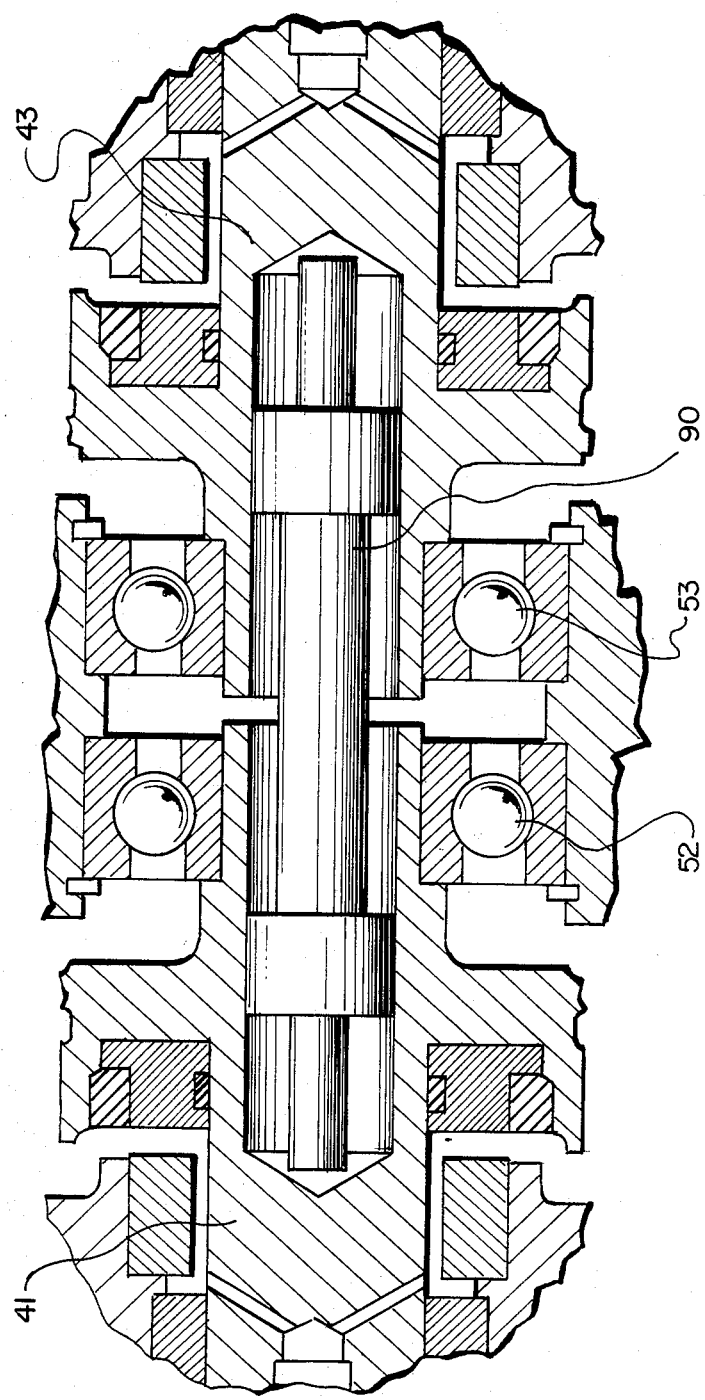
FIG. 2 is a partial cross-section showing the dual pump system of FIG. 1 with a coupling device for the shafts.

FIG. 2 illustrates how the two motor shafts 41, 43 can be connected together by coupling them with a splined bar 90, thereby forcing the rotors and pumps to rotate at the same speed.

As compared to turbopumps driven by a hot gas turbine, the advantages of the present invention are:

No high stress and high temperature problems.
No thermal soakback from the turbine to the pump.
No separation of hot turbine gas from pump propellant fluid is required.
No requirement for a gas generator and related hardware.
Each pump can be tuned to rotate at the optimal rotational speed for its pumped fluid.
The pumps may run in counterrotation for better torque balance (particularly critical in spacecraft applications).
Counterrotating pumps (impellers and inducers) may be of identical design and have same hardware except modified or trimmed for performance optimization.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An integrated dual pump system for pumping a fluid having counterrotating and varying speed capabilities and utilizing only a single brushless electric motor comprising:
   an axially aligned, centrally located, annular stator;
   independently functioning dual electromagnetic coils associated with the stator;
   opposing annular rotors including rotor faces positioned on each side of the stator so that one rotor face opposes the other rotor face;
   motor shafts for each rotor being fixedly attached thereto for independent variable rotation of each shaft;
   magnets selectively positioned and retained in each rotor face opposite the electromagnetic coils;
   pumps including functioning means positioned and integrally retained within the dual pump system;
   pump shafts integrally connected to the pumps and to the motor shafts;
   means for selectively functioning the dual electromagnetic coils and rotors to vary the speed of the rotors and to rotate the rotors and therefore the motor shafts in opposite directions;
   cooling and lubricating means, including a cooling and lubricating fluid, associated with the dual pump system; and
   means for introducing a fluid into the system.

2. An integrated dual pump system according to claim 1 wherein the pump functioning means includes an impeller attached to the pump shaft terminus of each pump.

3. An integrated dual pump system according to claim 1 wherein the pumps further include an inducer associated with the impeller of each pump.

4. An integrated dual pump system according to claim 1 wherein the pumps functioning means also includes commutated d.c. current controllably fed to the electromagnetic coils of the stator.

5. An integrated dual pump system according to claim 1 wherein the means for selectively functioning the stator coils and rotors include independent position and speed sensors to sense the position and speed of each rotor so as to control the flow of current to the stator coils for independently controlling the direction and speed of rotation of each rotor.

6. An integrated dual pump system according to claim 1 wherein the cooling and lubrication means include cooling and lubricating conduits and passageways interconnecting the pumps and the integrated dual pump system interior for selectively conveying a cooling and lubricating fluid therethrough.

7. An integrated dual pump system according to claim 1 wherein the means for introducing a fluid into the pumps includes input and output conduits in cooperative association with the impellers, inducers, stators, and rotors.

8. An integrated dual pump system utilizing only a single electric motor for pumping a fluid comprising:
   an axially aligned, centrally located annular stator;
   independently functioning dual electromagnetic coils associated with the stator;
   opposing annular rotors including rotor faces positioned on each side of the stator coils so that one rotor face opposes the other rotor face;
   motor shafts integrally associated with the stator and rotors;
   magnets positioned and retained in each rotor face opposite the electromagnetic coils;
   pumps including functioning means positioned and integrally retained within the dual pump system;
   pump shafts integrally connected to the pumps and to the motor shafts;
   means for functioning the dual electromagnetic coils and rotors to vary the speed of the rotors and to rotate the rotors and therefore the motor shafts;
   means for coupling the motor shafts for synchronous rotation in a single direction such that the pumps simultaneously pump a fluid;
   cooling and lubricating means including a cooling and lubricating fluid associated with the dual pump system; and
   means for introducing a fluid into the system.

9. An integrated dual pump system according to claim 8 wherein the pump functioning means include an impeller attached to the pump shaft terminus of each pump.

10. An integrated dual pump system according to claim 8 wherein the pumps further include an inducer associated with the impeller of each pump.

11. An integrated dual pump system according to claim 8 wherein the pumps functioning means also includes commutated d.c. current controllably fed to the electromagnetic coils of the stator.

12. An integrated dual pump system according to claim 8 wherein the means for functioning the stator coils and rotors include independent position and speed sensors to sense the position and speed of each rotor so as to control the flow of current to the stator coils for controlling the direction and speed of rotation of the rotors.

13. An integrated dual pump system according to claim 8 wherein the cooling and lubrication means include cooling and lubricating conduits and passageways interconnecting the pumps and the integrated dual pump system interior for selectively conveying a cooling and lubricating fluid therethrough.

14. An integrated dual pump system according to claim 8 wherein the means for introducing a fluid into the pumps includes input and output conduits in cooperative associate with the impellers, inducers, stators, and rotors.

15. An integrated dual pump system according to claim 8 wherein means for coupling the motor shafts for synchronous rotation in a single direction comprises a shaft coupling splined bar.

* * * * *